US009389671B2

United States Patent
Du et al.

(10) Patent No.: US 9,389,671 B2
(45) Date of Patent: Jul. 12, 2016

(54) POWER CONTROL DEVICE AND POWER CONTROL METHOD FOR THIN CLIENT DISPLAY

(75) Inventors: Guanglei Du, Beijing (CN); Fedja Kecman, St. Louis Park, MN (US); Shannon L. Siefken, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 249 days.

(21) Appl. No.: 14/130,016

(22) PCT Filed: Jul. 3, 2012

(86) PCT No.: PCT/US2012/045337
§ 371 (c)(1),
(2), (4) Date: Apr. 10, 2014

(87) PCT Pub. No.: WO2013/006591
PCT Pub. Date: Jan. 10, 2013

(65) Prior Publication Data
US 2014/0223207 A1      Aug. 7, 2014

(30) Foreign Application Priority Data

Jul. 5, 2011   (CN) .......................... 2011 1 0186968

(51) Int. Cl.
*G06F 1/32*      (2006.01)
*G06F 1/26*      (2006.01)
(Continued)

(52) U.S. Cl.
CPC .............. *G06F 1/3215* (2013.01); *G06F 1/324* (2013.01); *G06F 1/3206* (2013.01);
(Continued)

(58) Field of Classification Search
CPC ..... G06F 1/3206; G06F 1/3234; G06F 1/266; G06F 13/00; G06F 9/4445; G06F 9/4417
USPC ...................... 713/300, 320; 710/15; 709/203
See application file for complete search history.

(56) References Cited

U.S. PATENT DOCUMENTS

| 7,228,448 | B2 | 6/2007 | Anderson |
| 7,454,641 | B2 | 11/2008 | Connor |

(Continued)

FOREIGN PATENT DOCUMENTS

| EP | 1099999 | 5/2001 |
| EP | 1981207 | 10/2008 |

(Continued)

OTHER PUBLICATIONS

International Search Report for PCT International Application No. PCT/US2012/045337 Mailed on Sep. 26, 2012, 3 pages.

*Primary Examiner* — Ji H Bae
(74) *Attorney, Agent, or Firm* — Lisa P. Fulton

(57) ABSTRACT

The present invention provides a power control device, a machine comprising the same and a power control method. The device is used for an integrated machine comprising a thin client and a display and comprises: a current detecting unit for detecting the current flowing through a port in the thin client connecting to the peripheral device; and a control signal generating unit for generating a control signal based on the intensity of the detected current to adjust the power consumption of the display and/or the thin client to maintain no increase in the power consumption of the integrated machine. The power control device, the machine comprising the same and the power control method of the present invention can be used to avoid low efficiency resulting from the power reservations for peripheral devices connected by a USB port.

4 Claims, 6 Drawing Sheets

(51) Int. Cl.
*G06F 3/00* (2006.01)
*G06F 15/16* (2006.01)
*G06F 9/44* (2006.01)
*G06F 13/00* (2006.01)

(52) U.S. Cl.
CPC .......... *G06F 1/3234* (2013.01); *G06F 1/3265* (2013.01); *G06F 1/266* (2013.01); *G06F 9/4445* (2013.01); *G06F 13/00* (2013.01); *Y02B 60/1217* (2013.01); *Y02B 60/1242* (2013.01)

(56) References Cited

U.S. PATENT DOCUMENTS

| | | | |
|---|---|---|---|
| 7,791,854 B2 * | 9/2010 | Chu | G06F 1/266 361/93.9 |
| 8,295,886 B2 | 10/2012 | Kwon | |
| 8,656,194 B2 * | 2/2014 | Dove | G06F 1/266 713/300 |
| 2001/0044332 A1 | 11/2001 | Yamada | |
| 2005/0182986 A1 | 8/2005 | Anderson | |
| 2008/0244282 A1 * | 10/2008 | Hansalia | G06F 1/266 713/300 |
| 2008/0250255 A1 | 10/2008 | Diab | |
| 2009/0100275 A1 * | 4/2009 | Chang | G06F 1/266 713/300 |
| 2010/0007473 A1 * | 1/2010 | Fadell | G06F 13/426 713/300 |
| 2012/0017104 A1 * | 1/2012 | Siba | G06F 1/3203 713/323 |
| 2012/0198119 A1 * | 8/2012 | Johnson | G06F 13/4022 710/312 |
| 2012/0229703 A1 * | 9/2012 | Sartori | G09G 5/12 348/500 |
| 2014/0223207 A1 | 8/2014 | Du | |

FOREIGN PATENT DOCUMENTS

| | | |
|---|---|---|
| WO | WO 2007-024396 | 3/2007 |
| WO | WO 2010-013021 | 2/2010 |

\* cited by examiner

POWER CONTROL DEVICE AND POWER CONTROL METHOD FOR THIN CLIENT DISPLAY

BACKGROUND

The present invention relates to a power supply integrated machine. Specifically, the present invention relates to a power control device included in an integrated machine and a power control method.

SUMMARY

In current computer networks, thin clients are becoming more and more important. According to the prediction of Gartner, an IT consulting organization, approximately 35% of desktops would be transformed to server computing-based or cloud computing-based thin clients by 2014. Currently, many organizations and companies, such as Lenovo and HP, are doing research on thin client products using network cables to supply power. At present, Power over Ethernet (POE) is a popular way to reduce the terminal costs, operation costs and installation costs of a thin client. IEEE 802.3 AT and IEEE 802.3 AF are two standards of using Power over Ethernet (POE) in which IEEE 802.3 AT provides a standard of supplying a power of 15.4 watts (W) by each network cable port, while IEEE 802.3 AF provides a standard of supplying four grade powers of 4 W, 7 W, 15.4 W and 30 W by each network cable port.

In the current markets, the power supply capabilities of network cable power supply switches are different. Based on the load capacity of each network cable port, the network cable power supply switches can be classified into two categories, i.e., 15 W and 30 W, which are in accordance with the two standards IEEE 802.3 AF and AT respectively. The market price of a 30 W switch is high, and generally more than two times higher than the unit price of a single port 15 W switch (the unit price being the price of the switch divided by the number of ports). Most of the network cable-powered thin client integrated machines (including a display and a thin client main board, and supplying power to peripheral devices, such as a printer) currently used for desktop computing follow the 30 W standard.

FIG. 1 illustrates a prior art power supply solution wherein a network cable is used to supply power to a thin client integrated machine. In the method shown in FIG. 1, the same network cable is used to o carry out both data transmission and power supply to the thin client integrated machine. As described above, most of the current thin client integrated machines follow the 30 W standard. Therefore, the switch shown in FIG. 1 for supplying power to the thin client integrated machine must be a 30 W switch the price of which is more than two times higher than the unit price of a single port 15 W switch. Such a high price of the switch has limited the use of the thin client integrated machines.

In an integrated machine using a thin client, a system rated power is required to be reserved according to peripheral device ports (for example, USB ports) to supply power to peripheral devices, such as a printer. As a result, the power quota which can be used by other devices would be decreased so that a larger size screen or a much faster CPU may not be used. While the possibility of using such peripheral devices is low, the reservation of rated power for peripheral devices would result in a low utilization rate of the power in the integrated machine as described above.

Summary of the Invention

The present invention provides the following technical solutions to solve the problem of low utilization rate of power as described above.

According to one aspect of the present invention, a power control device for the integrated machine comprising a thin client and a display is provided. Said device comprises a current detecting unit for detecting the current flowing through the port in the thin client connected to a peripheral device; a control signal generating unit for generating a control signal based on the intensity of the detected current to adjust the power consumption of the display and/or the thin client to maintain no increase in the power consumption of the integrated machine.

According to another aspect of the present invention, a thin client disposed in an integrated machine comprising the thin client and a display is provided. The thin client comprises the power control device as described above, and a display/thin client controller for controlling the power consumption of the display and/or the thin client using the control signal provided by the power control device.

According to another aspect of the present invention, an integrated machine comprising the thin client and the display as described above is provided.

According to yet another aspect of the present invention, a power control method for an integrated machine comprising a thin client and a display is provided. Said power control method comprises: detecting the current flowing through the port in the thin client connected to a peripheral device; and generating a control signal based on the intensity of the detected current to adjust the power consumption of the display and/or the thin client to maintain no increase in the power consumption of the integrated machine.

By using the power control device, the thin client, the integrated machine and the power control method as described above, the power consumption of the display can be adjusted so that the total power consumption of the integrated machine is kept stable thereby avoiding the low efficiency resulting from the power reservations for peripheral devices connected by a USB port.

DETAILED DESCRIPTION

Figure 1:
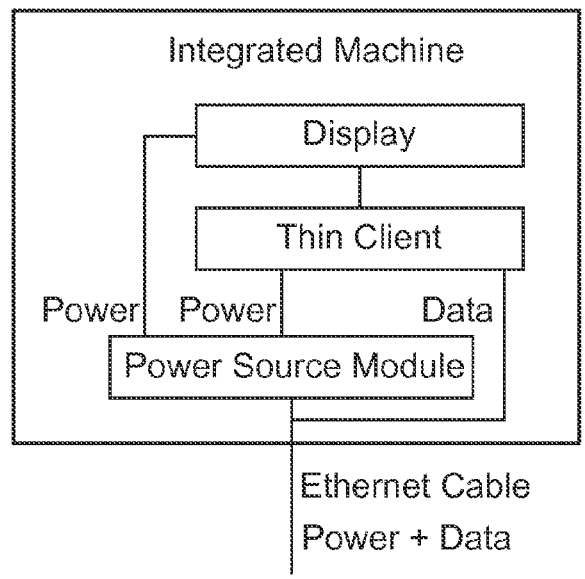
FIG. 1 is a schematic flow chart of a prior art power supply solution using a single network cable.
Figure 2:
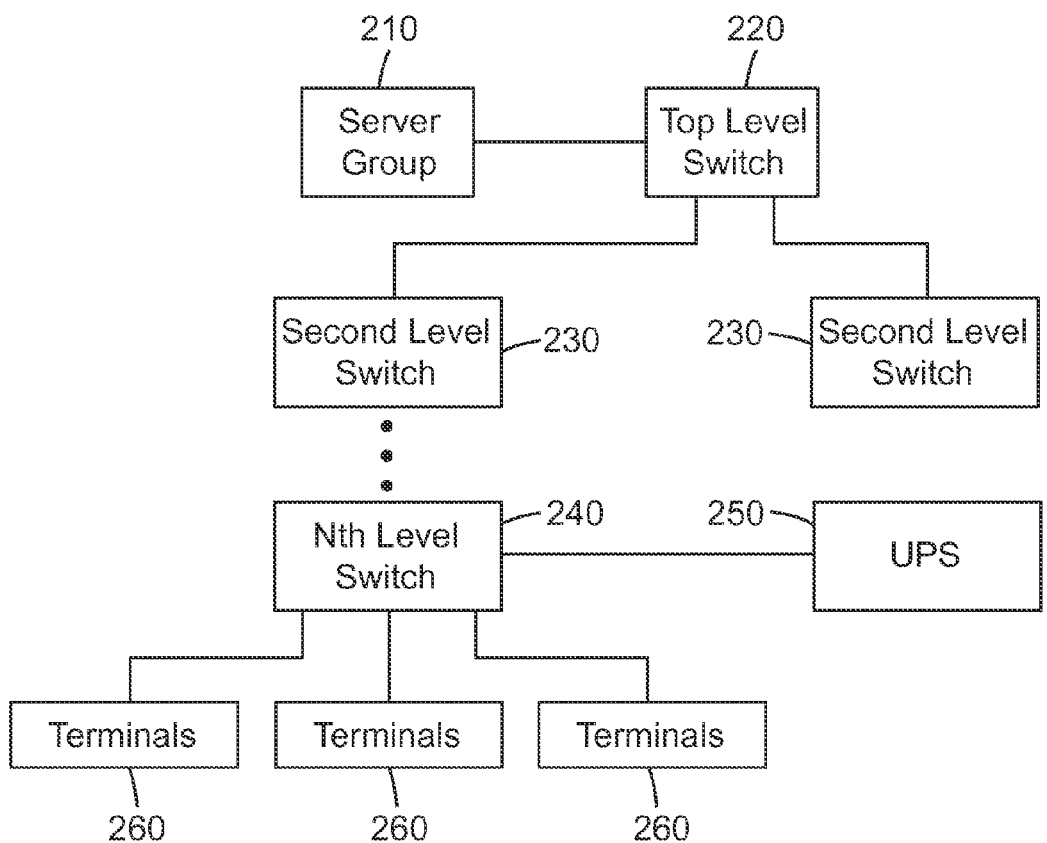
FIG. 2 is a network structure diagram of a thin client group using the present invention.

FIG. 2 is a diagram of a network structure using a thin client group. As shown in FIG. 2, the system comprises a server group 210, a top level switch 220 connected to the server group 210, a second level switch 230 connected to the top level switch, a bottom level switch 240 disposed at level N, terminals 260 preferably being a thin client integrated machine of the present invention, and a UPS 250 being a power source or a backup power source. In general, UPS 250 is disposed adjacent to the bottom level switch 240 such that terminals 260 are powered by UPS 250 via the bottom level switch 240. In actual applications, the network structure may only require one level of switch, i.e. the top level switch 220 is also the bottom level switch 240, and UPS 250 is connected to the top level switch 220. In some other cases, multi-level switches may be required. The present invention would not be limited to the network structure as illustrated.

As described above, the prior art uses one network cable to provide data and power to a thin client integrated machine (for example, terminals 260, as shown in FIG. 2). Currently, most of the thin client integrated machines follow the 30 W power supply standard. Therefore, this requires that the bottom level switch supplying power to the thin client integrated machine must be a 30 W switch, which is very expensive for certain applications. For solving this problem, as shown in FIG. 3 and FIG. 4, the present invention provides a solution for supplying power to the thin client integrated machine.

Figure 3:
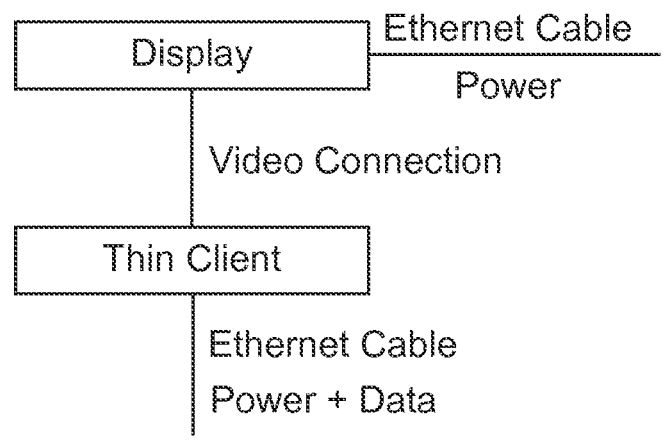
FIG. 3 is a schematic flow chart of a power supply solution using plurality of network cables according to the present invention.

In the solution shown in FIG. 3, two network cables are used respectively to supply power to the thin client and display of the integrated machine. The network cable supplying power to the thin client provides the thin client with a required power when transmitting data, while the network cable supplying power to the display only provides the power as required and does not transmit any data. Such a structure is easy to carry out and does not require substantive alterations to the circuits of existing integrated machines.

Figure 4:
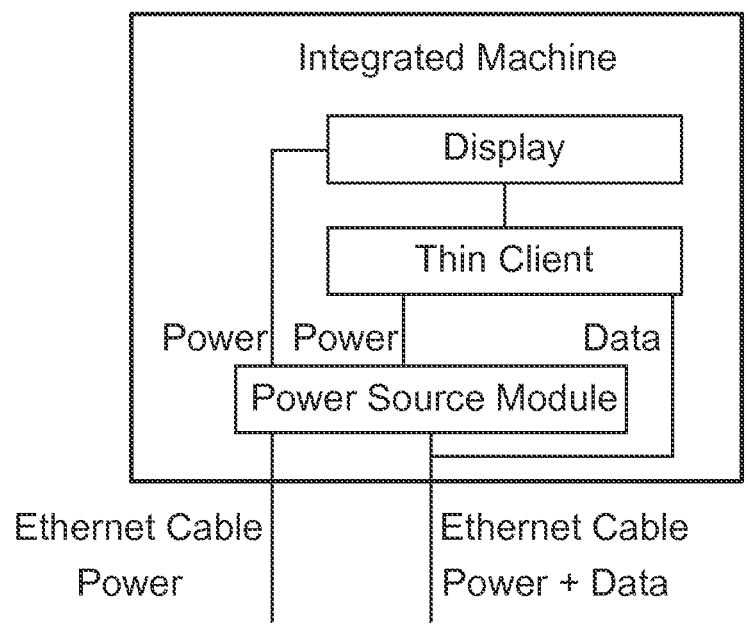
FIG. 4 is a schematic flow chart of another power supply solution using plurality of network cables according to the present invention.

In the solution shown in FIG. 4, two power supply network cables are connected into a power supply module where the powers from the two network cables are combined and then allocated according to the requirements of the thin client and the display. Compared with the solution shown in FIG. 3, a power combining circuit or a power combining device is required for the power supply module of the solution shown in FIG. 4, but a more flexible power allocation may be achieved.

Figure 5:
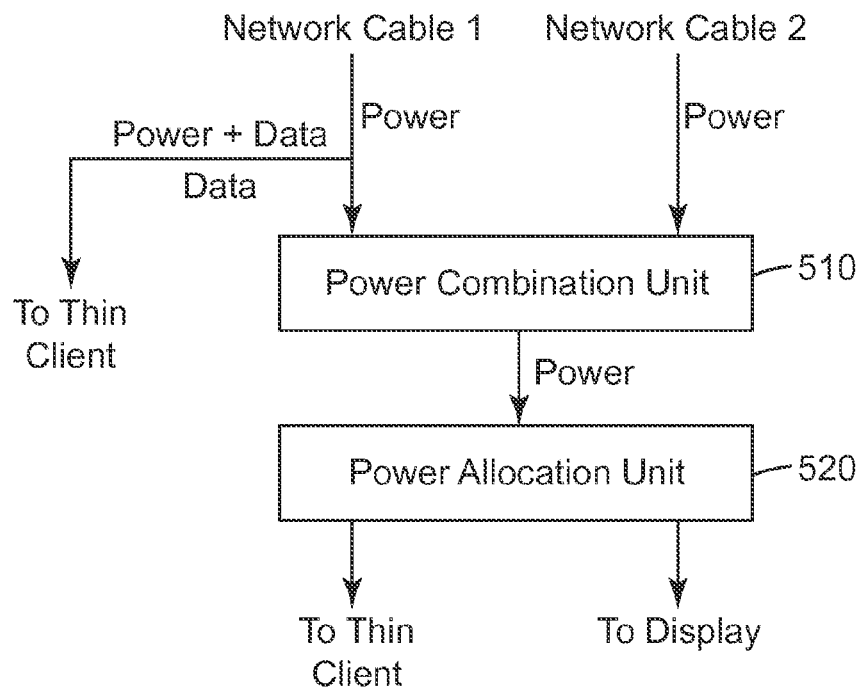
FIG. 5 is a schematic flow chart of the power supply module used in the power supply solution using plurality of network cables shown in FIG. 4.

FIG. 5 illustrates a schematic flow chart of the power supply module of the solution for supplying power shown in FIG. 4. For the purpose of clarity, devices and circuits, such as a voltage stabilizing circuit, a filter circuit and the like, which are not related to the functions described herein are omitted. However, in actual applications, such or other circuits or devices may be incorporated as required.

As shown in FIG. 5, network cable 1 is a network cable carrying both a power and data, while network cable 2 is a network cable only carrying a power. The network cable 1 transmits data to the thin client and supply power to the power combining unit 510. In this case, transmissions via different core line pairs of the network cable may be used to effect the separation of the data and the power. The power combining unit 510 combines the powers from the network cable 1 and network cable 2 to obtain a total power which will be allocated by a power allocation unit 520 according to the actual requirements of the thin client and display.

In another embodiment of the present invention, a thin client integrated machine may be a 30 W standard thin client integrated machine where the network cable 1 and network cable 2 each may carry a 15 W power. However, in other embodiments, a thin client integrated machine may require much more or less power, and the power supply of the thin client integrated machine may be carried out using much more network cables. In some embodiments, the powers carried by the network cable 1 and network cable 2 may be different. Although only one network cable carrying power and data is shown in FIG. 4 and FIG. 5, more network cables or even all of the network cables may carry both power and data. To a person of ordinary skill in the art, this would be understood and able to be carried out according to the enlightenment of the embodiments described herein.

In prior art, as the thin client may be connected to peripheral devices, such as a printer, a power for such peripheral devices is required to be reserved such that the peripheral devices can be normally used when the power consumption of the thin client per se is up to the peak. For example, in an example using an USB port, if the USB port consumes a power of 2.5 W, then the thin client would need to reserve a power of at least 2.5 W for the USB port. If the number of USB ports increases, more power reservations would be needed. However, as mentioned earlier, the possibility of using high power-consuming peripheral devices would be not high, thus such power reservations for peripheral devices would result in waste of power.

To address this problem, the present invention provides a solution wherein the power reservations for peripheral devices become unnecessary. The solution can monitor the current flowing through the port connecting the thin client and the peripheral devices, and adjust the power consumption of the display and/or the thin client by making the display darker or decreasing the power consumption of the components, such as the CPU, of the thin client (for example, by decreasing the number of running programs in the thin client, or lowering the frequency of the CPU).

Figure 6:
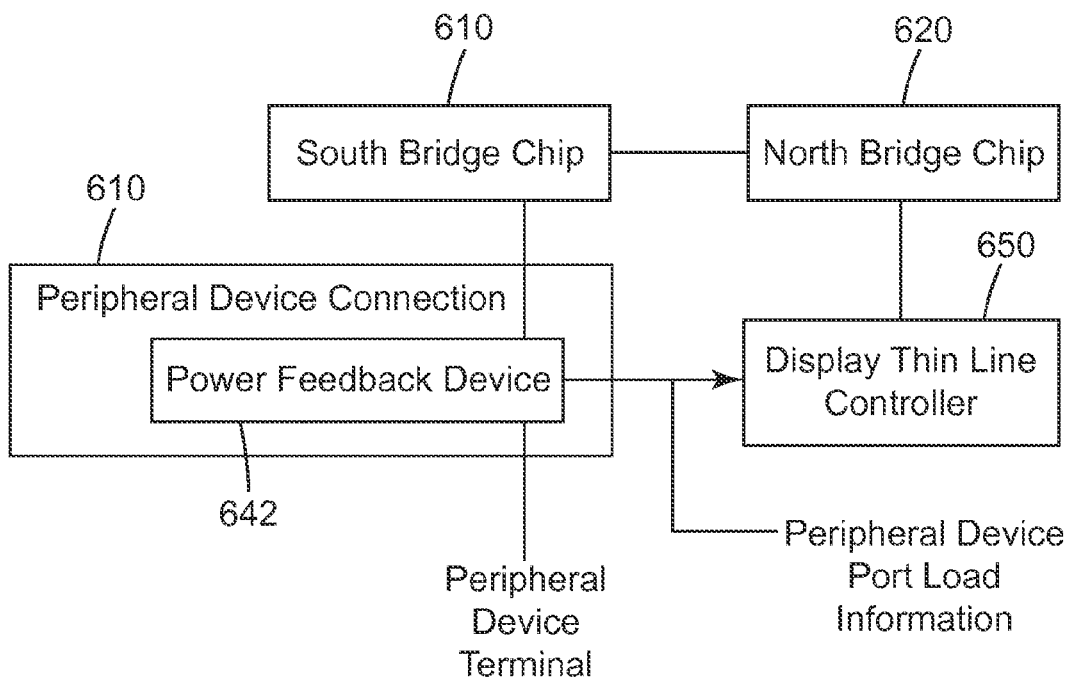
FIG. 6 is a simplified schematic diagram of the connections of the power control device according to an embodiment of the present invention.

In an embodiment of the present invention, as shown in FIG. 6, a power control device 642 is disposed in a peripheral device port 640 of the thin client. In FIG. 6, by monitoring the current flowing through the peripheral device port 640, the power control device 642 would generate a control signal including the load information of the peripheral device port and send the control signal to the display/thin client controller 650. The display/thin client controller 650 would control the power consumption of the display/thin client based on the control signal such that the power consumption of the display/thin client would decrease as the peripheral device port load increases. FIG. 6 also shows a south bridge chip 610 and a north bridge chip 620, which can be used respectively for the control of the peripheral device port 610 and the display/thin client controller 650.

Figure 7:
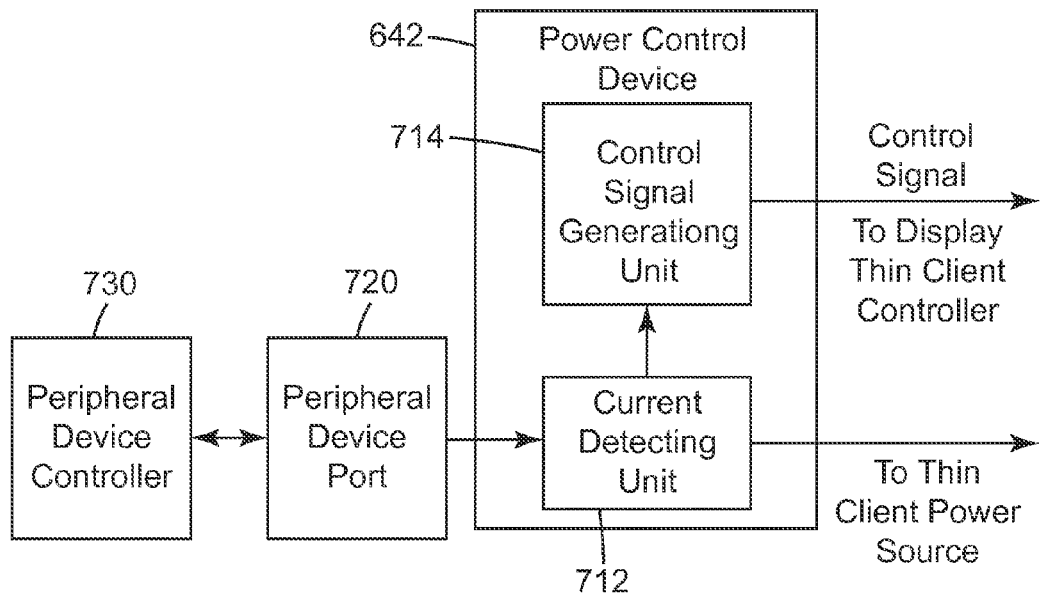
FIG. 7 is another simplified schematic diagram of the connections of the power control device according to an embodiment of the present invention wherein the inside modules of the power control device are shown.

FIG. 7 shows a schematic structure flow chart of the connection of the power control device 642 and the peripheral device port. In FIG. 7, a current detecting unit 712 of the power control device 642 detects the current flowing through the peripheral device port 720. In a particular embodiment, the current flow to be detected is the current flowing through the power supply pins of the peripheral device port 720 (for example, the power supply pins of a USB port). When the peripheral device controller 730 (for example, a USB controller) is inserted into a peripheral device connection 640 of a thin client and the peripheral device is started, a current will be generated at the peripheral device port 720 due to power consumption. The current detecting unit 712 detects the current and the control signal generating unit 714 will generate a control signal to be used by a display/thin client controller 650. Said control signal may be an analog control signal or a digital control signal.

For the purpose of easier description, the following description will be directed to cases where the peripheral device ports are USB ports and the power consumption of the displays will be decreased. However, the peripheral device ports of the embodiments of the present invention would not be limited to USB ports, and the power consumption to be decreased would not be limited to the power consumption of displays.

Figure 8:
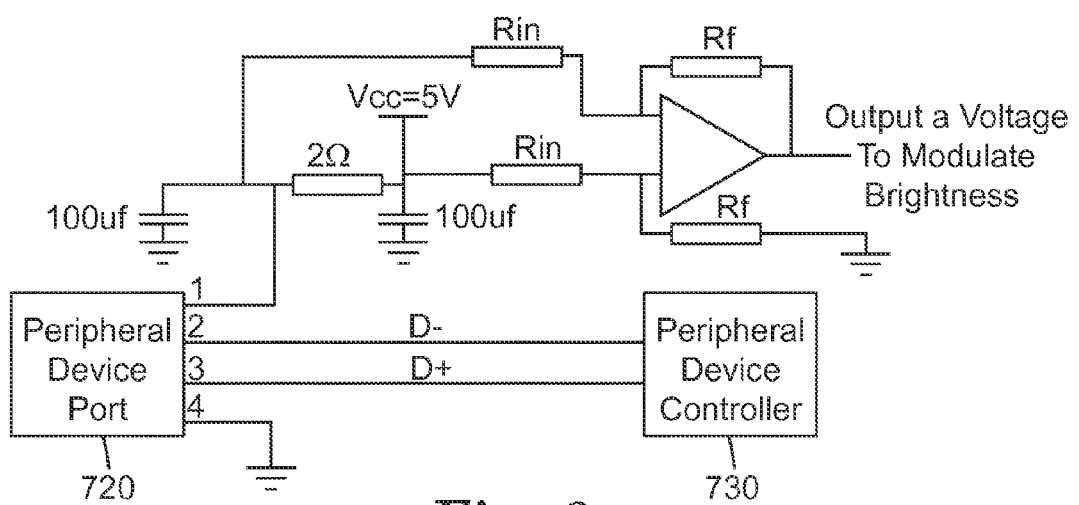
FIG. 8 is a schematic diagram of a power control circuit of the present invention where the control signal is an analog control signal.

FIG. 8 shows a particular circuit of the power control device 642 in cases where the control signal is an analog control signal. In FIG. 8, a current detecting resistance is used to effect the power detecting unit 712 and an operational amplifier is used to effect the control signal generating unit 714. In an embodiment of the present invention, the current detecting resistance is 2 ohms (Ω). As shown in FIG. 8, the current flowing through the power supply pins of the peripheral device port (a USB port) generates a voltage drop of from 0 to 1 volt on the current detecting resistance. The voltage drop is amplified by an operational amplifier to from 0 to 5 volts. In the embodiment as shown in FIG. 8, the control signal generated by the control signal generating unit 714 is an analog voltage output by the operational amplifier. The display controller 630 can use said analog voltage as an analog light modulation signal to effect direct control of the brightness of the display. For example, when the output analog voltage is 5 volts, the brightness of the display will be modulated to the darkest; when the output analog voltage is 0 volt, the display will be modulated to the brightest. Of course, the relationship between the output voltage and display brightness would not be limited to the description of the embodiments herein, other control methods which can be contemplated by a person of ordinary skill in the art may also be used. In the embodiments where the display is a liquid crystal display (LED), the display controller 630 may also be a backlit control unit disposed at the LED display.

It should be understood that the particular circuits as shown in FIG. 8 are illustrative only but not for limiting. For example, in the circuits as shown in FIG. 8, the Rf/Rin value can be taken as 5. However, the Rf/Rin value can also be taken as different respective values in other useful connections of the operational amplifiers known to a person of ordinary skill in the art. Additionally, the capacitance of FIG. 8 can also be other values, or a capacitor group consisting of a plurality of capacitors. Even other types of amplifiers or amplifier groups may be used to carry out the functions of the operational amplifier shown in FIG. 8. This would be achievable to a person of ordinary skill in the art according to the embodiments described herein.

When the control signal is a digital control signal, the control signal generating unit 714 is required to transform the voltage drop generated on the current detecting unit (for example, a current detecting resistance) to a digital form. In an embodiment of the present invention, the control signal generating unit 714 may include an amplifier, an analog to digital converter and a pulse width modulation signal generating circuit. The analog voltage drop generating on the current detecting resistance is amplified by the amplifier and the amplified voltage drop is converted by the analog to digital converter and the voltage drop is output in a digital representation. The pulse width modulation signal generating circuit generates a pulse width modulation signal (PWM) in accordance with the digital representation. The pulse width modulation signal is used by the display controller 630 (for example, the control chip of a LED) to effect PWM lighting adjustment of the display. Particular methods of PWM lighting adjustment are known in the art and thus would not be discussed further.

Figure 9:
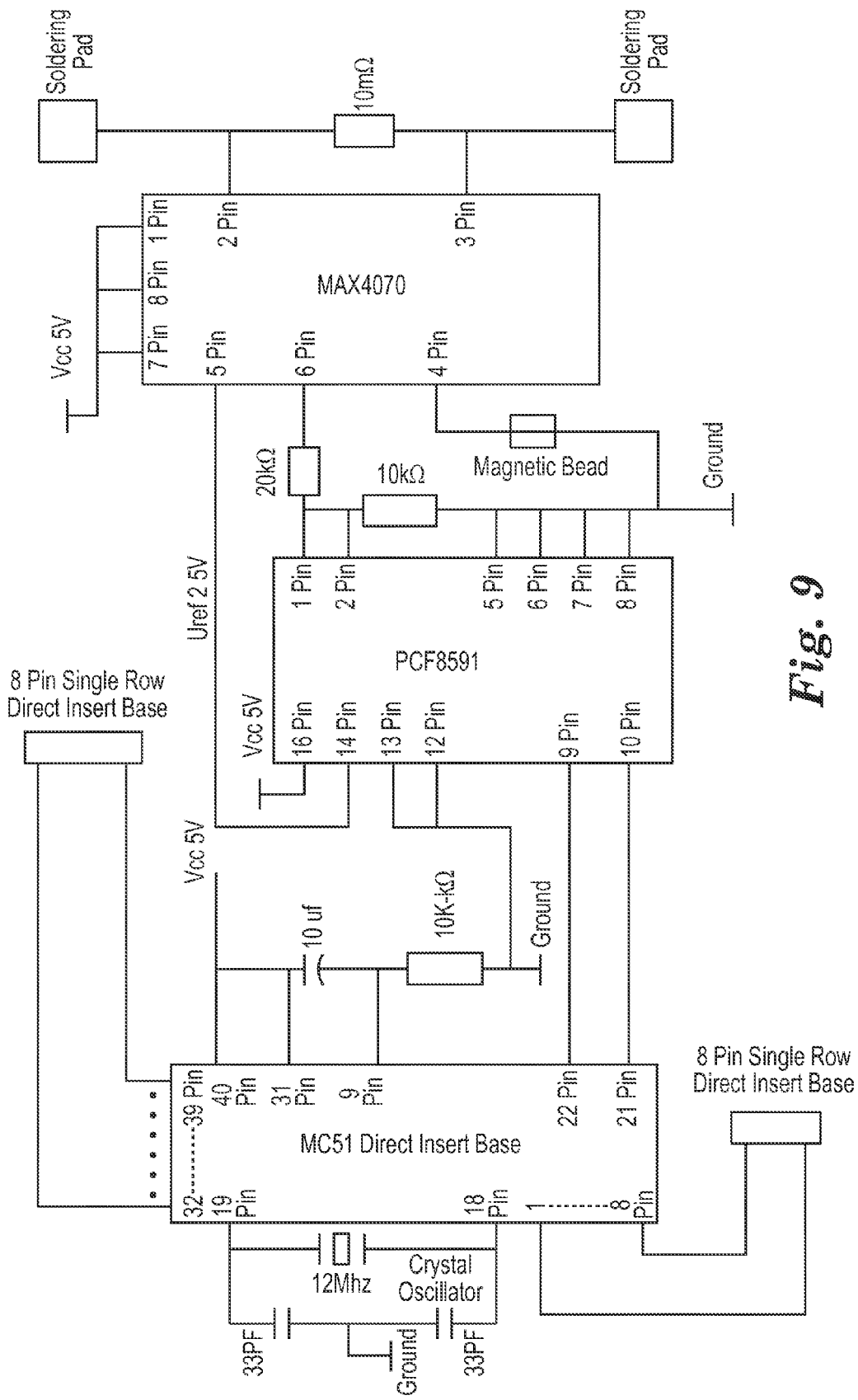
FIG. 9 is a schematic diagram of another power control circuit of the present invention where the control signal is a digital control signal.

FIG. 9 shows a particular circuit of the power control device 642 where the control signal is a digital control signal. In the embodiment shown in FIG. 9, a current detecting resistance is used to effect the current detecting unit 712. In an example of the present invention, the current detecting resistance is taken as 10 milliohms (mΩ). In the particular circuit shown in FIG. 9, the amplifier is differential amplifier MAX4070 (available from MAXIM Integrated Products, Inc). The voltage drop generated on the current detecting resistance by the current flowing through the USB port is amplified as a differential voltage by the differential amplifier MAX4070 and sent to an analog to digital converter, such as analog to digital converter PCF 8591 (available from Phillips Semiconductors). The input differential voltage is converted to a digital representation of the voltage drop generated on the current detecting resistance by the analog digital to converter PCF 8591, and modulated to a pulse width modulation signal by a pulse width modulation signal generating circuit (for example, a MCU) disposed at the MC 51 direct insert type base to effect the PWM lighting modulation of the display.

Similarly, it should be understood that the particular circuits shown in FIG. 9 are illustrative only but not for limiting. In the circuits shown in FIG. 9, the amplifier, the analog to digital converter and the pulse width modulation signal generating circuit would not be limited to the chip models as used, or the types used in the circuits shown in FIG. 9. For example, a non-differential amplifier may also be used as the amplifier of the present invention. In cases that chips different from those shown in FIG. 9 are used, the elements, or even the connections of the chips and elements may also change accordingly. For example, an external circuit may be used to provide a clock signal, thus the crystal oscillator as shown in FIG. 9 would be unnecessary. In some embodiments of the present invention, more or less chips may be used to effect the functions of the chips in the embodiment shown in FIG. 9.

In the examples of the present invention as described above, a USB port is taken as an example for the peripheral device ports. However, it is for the purpose of easier description only. It should be understood, to a person of ordinary skill in the art, that any type of peripheral device port may be used in the present invention, as long as the current detecting unit (for example, a current detecting resistance) is changed from being in series connection with the power supply pins of the USB port to being in series connection with the power supply pins of another type of peripheral device port.

In other embodiments of the present invention, the power consumption of the display may not be controlled but instead the power consumption of the thin client is to be controlled. In such cases, the control signal to be used for controlling the power consumption of the thin client would also related to the current at the peripheral device port. The only differences are that the control is directed to a particular component and the type of the control signal would change. For example, in cases where the frequency of the CPU of the thin client is to be reduced, the control signal may be in a form which is adapted to the control of the CPU frequency. Particular examples may include arranging devices or circuits to be used to change the type of the control signal after the operational amplifier shown in FIG. 8 or the MCU shown in FIG. 9. Alternatively, the operational amplifier shown in FIG. 8 may be replaced by circuits suitable for generating control signals for particular components, or one or more of the amplifier, analog to digital converter and MCU are replaced by suitable circuits. Such additions or replacements would be easy to a person of ordinary skill in the art over the teachings or enlightenments of the embodiments disclosed herein.

In some embodiments of the present invention, the power consumption of both the display and thin client may be controlled. In such cases, a controller, such as a MCU, may be used to allocate the sequence as to which one of the display and the thin client is to be used first to decrease the power consumption or the proportion of the display and thin client in decreasing power consumption, and generate respective control signals. The ways as described above may be used to generate respective power control signals for the display and the thin client, but other ways well known to a person of ordinary skill in the art may also be used.

Figure 10:
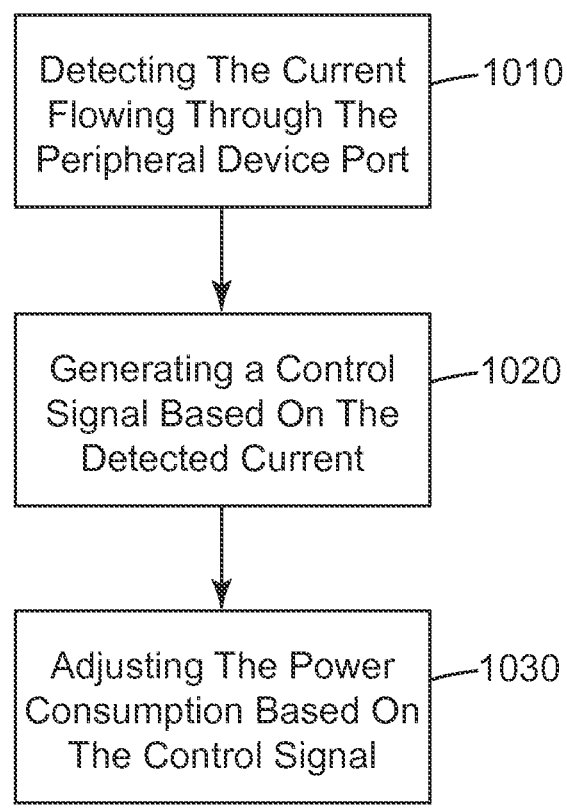
FIG. 10 is a flow chart of a power control method according to an embodiment of the present invention.

FIG. 10 shows a flow chart of a power control method according to the present invention. This method is used in a thin client integrated machine. In step 1010, the current flowing through the peripheral device port connected to a peripheral device in the thin client is detected. This step may be carried out by a resistance which is placed in series connection with the power supply pins. In step 1020, a control signal would be generated based on the current detected. In another particular example, a control signal would be generated based on the voltage drop generated on the current detecting resistance by the current detected. In step 1030, said control signal would be used to control the power consumption of the thin client integrated machine so that the total power consumption of the same would not be increased.

When the power consumption of the display is adjusted to have the total power consumption of the thin client integrated machine not increase, the control signal generated in step 1020 may be an analog control signal or a digital control signal. In case that the control signal is an analog control signal, the control signal may be generated by amplification of the voltage drop generated on the current detecting resistance by the current flowing therethrough using an operational amplifier. The amplified voltage drop may be used directly by a display controller, such as a backlit control unit of the display to effect an analog lighting modulation.

The control signal generated in step 1020 may also be a digital control signal. In such cases, the voltage drop generated on the current detecting resistance would be amplified by an amplifier. The output of the amplifier would be sent to an analog to digital converter to convert the same to a digital signal. A pulse width modulation signal generating circuit, such as a MCU, would generate a pulse width modulation signal based on said digital signal, which would be used by the control circuit of a display, such as a LCD display, to control the brightness of the same to effect PWM lighting modulation.

As described above, the power consumption of the thin client integrated machine may also be maintained no increase by adjusting the power consumption of the thin client (for example, the components included therein). In such cases, the control signal may just be changed to a signal which is adapted to the adjustment of particular components. But any way, the control signal would be correspond to the current at the peripheral device port.

Although various embodiments have been shown, it should be understood that the present invention should not be restricted to the above embodiments and particular circuits. Any apparent changes to the above embodiments under the teachings and enlightenments of the present invention should be considered being within the scope of the present invention.

What is claimed is:

1. A power control method for an integrated machine comprising a thin client and a display, said power control method comprising:
    detecting the current flowing through a port in the thin client connected to a peripheral device using a current detecting resistance, and
    generating a control signal based on the intensity of the detected current to adjust the power consumption of the display and/or the thin client to maintain no increase in the power consumption of the integrated machine;
    wherein in case that the power consumption of the integrated machine is maintained no increase by adjusting the power consumption of the display, said generating a control signal comprising: amplifying the voltage drop generated on the current detecting resistance by the current flowing through the peripheral device port to generate an analog light modulation signal to be used by a backlit control unit of the display.

2. The power control method according to claim 1, wherein the peripheral device port is a USB port.

3. A power control method for an integrated machine comprising a thin client and a display, said power control method comprising:
    detecting the current flowing through a port in the thin client connected to a peripheral device using a current detecting resistance, and
    generating a control signal based on the intensity of the detected current to adjust the power consumption of the display and/or the thin client to maintain no increase in the power consumption of the integrated machine;
    wherein in case that the power consumption of the integrated machine is maintained no increase by adjusting the power consumption of the display, said generating a control signal comprising:
    amplifying the voltage drop generated on the current detecting resistance by the current flowing through the peripheral device port;
    converting the amplified voltage drop to a digital representation of the voltage drop; and
    generating a pulse width modulation signal in accordance with the digital representation of the voltage drop, the pulse width modulation signal is used by a display controller to effect pulse width modulation lighting adjustment of the display.

4. The power control method according to claim 3, wherein the peripheral device port is a USB port.

* * * * *